(12) United States Patent
Veluppillai et al.

(10) Patent No.: US 9,246,211 B2
(45) Date of Patent: Jan. 26, 2016

(54) PORTABLE ELECTRONIC DEVICE AND METHOD FOR TUNING AN ANTENNA

(75) Inventors: Mahinthan Veluppillai, Kitchener (CA); Riyaz Shamshudin Jamal, Waterloo (CA); Nagula Tharma Sangary, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 285 days.

(21) Appl. No.: 13/411,798

(22) Filed: Mar. 5, 2012

(65) Prior Publication Data

US 2013/0231068 A1 Sep. 5, 2013

(51) Int. Cl.
H04B 7/00 (2006.01)
H04B 17/00 (2015.01)
H04B 1/18 (2006.01)
H01Q 1/24 (2006.01)
H01Q 1/22 (2006.01)

(52) U.S. Cl.
CPC . *H01Q 1/242* (2013.01); *H01Q 1/22* (2013.01)

(58) Field of Classification Search
CPC ................................ H01Q 1/242; H01Q 1/22
USPC .............................. 455/67.11, 77, 41.2, 193.1
See application file for complete search history.

(56) References Cited

U.S. PATENT DOCUMENTS

| 8,204,446 | B2 | 6/2012 | Scheer et al. | |
| 2008/0090537 | A1* | 4/2008 | Sutardja | 455/232.1 |
| 2009/0121945 | A1* | 5/2009 | Tani et al. | 343/702 |
| 2009/0247077 | A1* | 10/2009 | Sklovsky et al. | 455/41.1 |
| 2010/0302123 | A1 | 12/2010 | Knudsen et al. | |
| 2010/0330940 | A1 | 12/2010 | Sheynblat et al. | |
| 2011/0105023 | A1* | 5/2011 | Scheer et al. | 455/41.2 |
| 2012/0023060 | A1* | 1/2012 | Rothkopf | 706/52 |

FOREIGN PATENT DOCUMENTS

| CN | 101529652 A | 9/2009 |
| CN | 102047223 A | 5/2011 |
| EP | 2106107 B1 | 4/2012 |
| EP | 2078324 B1 | 5/2013 |
| WO | 2011062692 A1 | 5/2011 |

OTHER PUBLICATIONS

Corresponding European Patent Application No. 13157578.9 Search Report dated Mar. 6, 2014.
Office Action dated Oct. 29, 2014, issued to Corresponding Chinese Patent Application No. 201310067193.8.

* cited by examiner

*Primary Examiner* — Ping Hsieh
*Assistant Examiner* — Xin Jia
(74) *Attorney, Agent, or Firm* — Perry + Currier, Inc.

(57) ABSTRACT

A portable electronic device and method for tuning an antenna is provided. The portable electronic device includes an antenna, a tunable element, a first input unit, at least one additional input unit, and a processor. The method involves receiving a first set of data, determining a plurality of possible physical states, activating a second input unit, receiving a second set of data from the second input unit, selecting a physical state of the portable electronic device from the plurality of possible physical states, and tuning the antenna based on the physical state of the portable electronic device.

20 Claims, 7 Drawing Sheets

PORTABLE ELECTRONIC DEVICE AND METHOD FOR TUNING AN ANTENNA

FIELD

The present specification relates generally to portable electronic devices, and more particularly to a portable electronic device with tunable antennas.

BACKGROUND

The evolution of computers is currently quite active in the portable electronic device environment. As the portable electronic devices decrease in size, the space available for an antenna generally decreases as well. This ultimately leads to a decrease in the performance of the antenna. Indeed, there has been a veritable explosion in the number and type of portable electronic devices that have antennae packaged in small spaces.

BRIEF DESCRIPTION OF THE DRAWINGS

Reference will now be made, by way of example only, to the accompanying drawings in which.

DETAILED DESCRIPTION OF THE EMBODIMENTS

Figure 1:
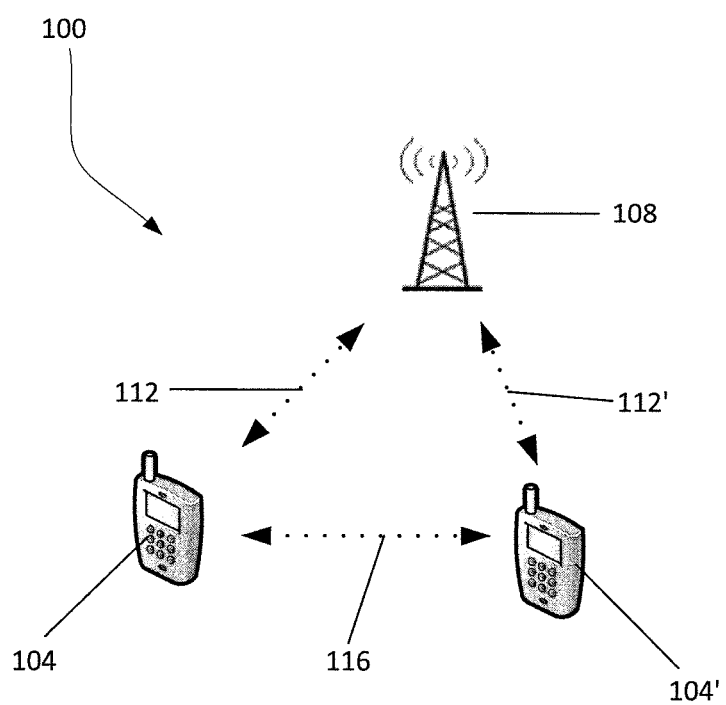
FIG. 1 is a perspective view of a system in accordance with an embodiment.

In accordance with an aspect of the specification, there is provided a method for tuning an antenna in a portable electronic device. The method comprises receiving a first set of data from a first input unit. The method further comprises determining a plurality of possible physical states of the portable electronic device using the first set of data. Furthermore, the method comprises activating a second input unit. The method also comprises receiving a second set of data from the second input unit. In addition, the method comprises selecting a physical state of the portable electronic device from the plurality of possible physical states using the second set of data. The method further comprises tuning the antenna based on the physical state of the portable electronic device.

Receiving a first set of data may comprise receiving a first set of data from a dedicated sensor.

Determining a plurality of possible physical states may comprise determining a plurality of possible physical states using a decision making subsystem. The method may further comprise selecting the second input unit using the decision making subsystem.

Selecting a physical state may comprise selecting a physical state using a decision making subsystem. The method may further comprise activating the decision making subsystem prior to selecting a physical state comprises selecting a physical state using a decision making subsystem.

The method may further comprise selecting the second input unit based on the plurality of possible physical states.

Tuning the antenna may comprise selecting parameters corresponding to the physical state of the portable electronic device. Selecting the parameters may comprise retrieving the parameters from a database.

The method may further comprise fine-tuning the antenna using a tuning algorithm.

In accordance with another aspect of the specification, there is provided a portable electronic device. The portable electronic device includes an antenna. The portable electronic device further includes a tunable element for tuning the antenna. The portable electronic device also includes a tunable element for tuning the antenna also includes a first input unit for receiving a first set of data. Furthermore, the portable electronic device further includes a first input unit for receiving a first set of data includes at least one additional input unit for receiving a second set of data. In addition, the portable electronic device includes at least one additional input unit for receiving a second set of data. The portable electronic device further includes a processor in communication with the tunable element, the first input unit, and the second input unit. The processor is configured to receive the first set of data. The processor is further configured to determine a plurality of possible physical states of the portable electronic device using the first set of data. Furthermore, the processor is configured to activate a second input unit selected from the at least one additional input unit. In addition, the processor is configured to receive the second set of data from the second input unit. The processor is also configured to select a physical state of the portable electronic device from the plurality of possible physical states using the second set of data. The processor is further configured to cause the tunable element to tune the antenna based on the physical state of the portable electronic device.

The first input unit may include a dedicated sensor.

The processor may include a decision making subsystem configured to determine a plurality of possible physical states.

The processor may include a decision making subsystem configured to select a physical state from the plurality of possible physical states. The processor may be configured to activate the decision making subsystem.

The processor may be further configured to select the second input unit based on the plurality of possible physical states.

The processor may be configured to send parameters to the tunable element, the parameters corresponding to the physical state of the portable electronic device. The portable electronic device may further include a database for storing the parameters. The database may be in communication with the processor.

The tunable element may be configured to fine-tune the antenna using a tuning algorithm.

In accordance with another aspect of the specification, there is provided a computer readable storage medium encoded with codes. The codes are for directing a processor to receive a first set of data from a first input unit. The codes are further for directing a processor to determine a plurality of possible physical states of the portable electronic device using the first set of data. Furthermore, the codes are for directing a processor to activate a second input unit. In addition, the codes are for directing a processor to receive a second set of data from the second input unit. Also, the codes are for directing a processor to select a physical state of the portable electronic device from the plurality of possible physical states using the second set of data. The codes are also for directing a processor to tune the antenna based on the physical state of the portable electronic device.

Referring now to FIG. 1, a schematic representation of a non-limiting example of a system 100 for wireless communication is shown. It is to be understood that the system 100 is purely exemplary and it will become apparent to those skilled in the art that a variety of systems are contemplated. The system 100 includes portable electronic devices 104 and 104' for sending and receiving data wirelessly, and a base station 108 for communicating with the portable electronic devices 104 and 104' over a wireless transmission links 112 and 112', respectively. Furthermore, it is contemplated that the portable electronic device 104 can optionally establish a device link 116 for direct communication between the portable electronic devices 104 and 104' without using the base station 108.

In the present embodiment, the base station 108 is part of a wireless network provided by a carrier. The wireless network provides access to other networks, such as the Internet or a telephone network, for the portable electronic device 104. In particular, data is delivered to the portable electronic device 104 via the wireless transmission link 112 from the base station 108. Similarly, data is sent from the portable electronic device 104 via the wireless transmission link 112 to the base station 108.

It will be appreciated that the portable electronic device 104 is movable within a coverage area of the base station 108 and can be moved to coverage areas defined by other base stations. Furthermore, it is to be understood by one of ordinary skill in the art that wireless networks can include GSM/GPRS, CDPD, TDMA, iDEN Mobitex, DataTAC networks, EDGE or UMTS and broadband networks including variants of 802.11.

The portable electronic device 104 is generally configured to communicate with the base station 108 via the wireless transmission link 112. In particular, the portable electronic device 104 is configured to receive content from the wireless transmission link 112 and generate associated output at an output device of the portable electronic device. In addition, the portable electronic device 104 is also configured to receive input from an input device and send data associated with the input over the wireless transmission link 112. For example, in the present embodiment, the portable electronic device 104 can receive voice content from the wireless transmission link 112 to generate output at a speaker. In turn, the portable electronic device 104 can receive sound input from a microphone and send associated data over the wireless transmission link 112. However, it is to be re-emphasized that the system shown in FIG. 1 is a non-limiting representation only. For example, although only one portable electronic device 104 is shown in FIG. 1, it is to be understood that the system 100 can be modified to include a plurality of portable electronic devices 104, each of the portable electronic devices 104 having its own wireless transmission link 112. Furthermore, it is also to be understood that the portable electronic device 104 can be simultaneously connected to a plurality of base stations 108 if the portable electronic device 104 is within the range of more than one base station. Indeed, a plurality of different configurations of the system 100 is contemplated herein.

Figure 2:
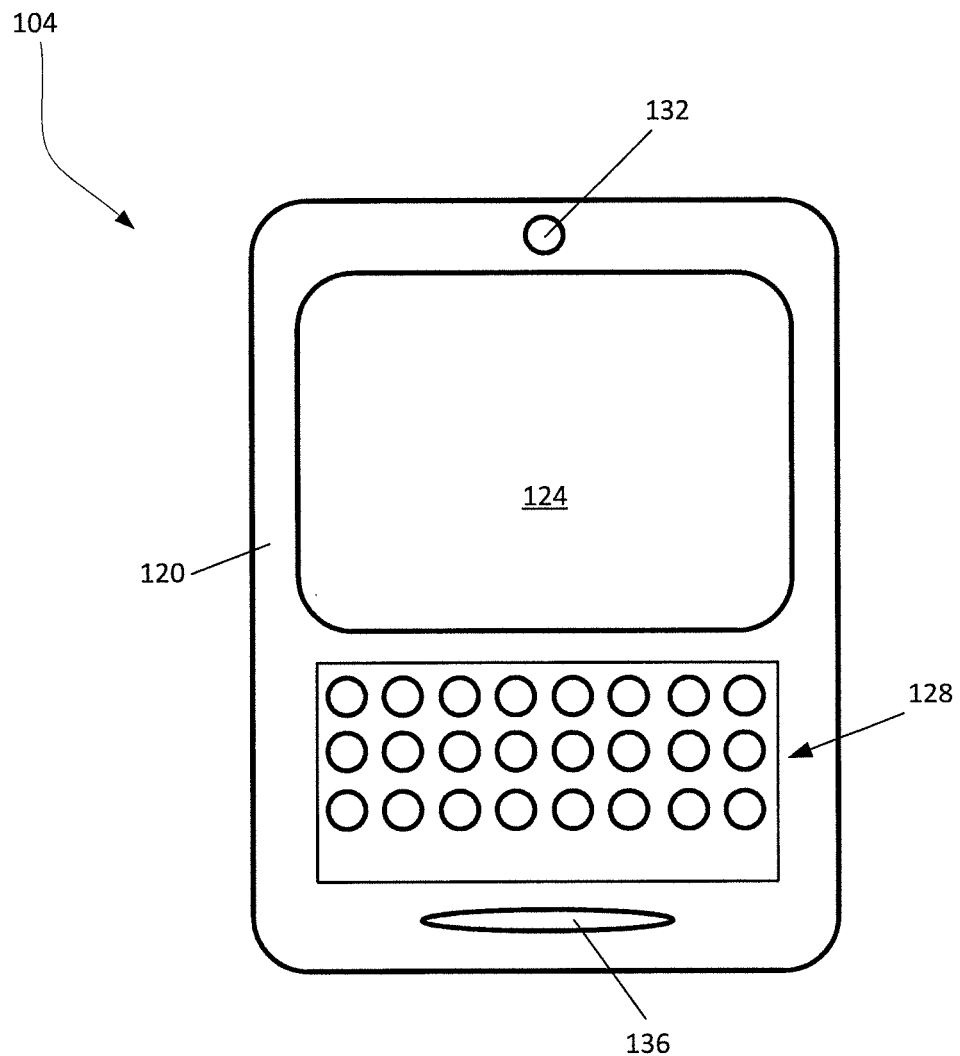
FIG. 2 is a front view of a portable electronic device in accordance with an embodiment.

Referring to FIG. 2, the portable electronic device 104 is shown in greater detail. It is to be understood that the portable electronic device 104 is purely exemplary and it will be apparent to those skilled in the art that a wide variety of portable electronic devices are contemplated. For example, variations on the portable electronic device 104 can include, without limitation, a cellular telephone, a portable email paging device, a camera, a portable music player, a portable video player, a personal digital assistant, a portable book reader, a portable video game player, a tablet computer, a netbook computer, or a laptop computer. Other contemplated variations include devices which are not necessarily portable, such as desktop computers. In the present embodiment, the portable electronic device 104 includes a chassis 120 that supports a display 124, a plurality of keys 128, a speaker 132 and a microphone 136.

The chassis 120 is generally configured to support and protect the remaining components of the portable electronic device 104. In terms of providing physical support, the chassis 120 is typically configured to be mechanically strong enough to provide a rigid or flexible support for the other components of the portable electronic device 104. Furthermore, the chassis 120 is typically constructed such that it is rigid and strong enough to protect the internal components of the portable electronic device 104 from the elements and physical shock. In the present embodiment, it is to be understood that the chassis 120 is generally manufactured from a rigid and strong material such as plastic or metal protect internal components of from traumatic events such as being accidentally dropped. Alternatively, it is also to be understood that in other embodiments, the portable electronic device 104 can be modified to be a flexible device such that the chassis would also necessarily be flexible.

The display 124 can comprise one or more light emitters such as an array of light emitting diodes (LED), liquid crystals, plasma cells, or organic light emitting diodes (OLED). Other types of light emitters are also contemplated. Furthermore, an optional touch membrane can be overlaid on the display 124 to provide a touchscreen input device.

In the present embodiment, the portable electronic device 104 includes a plurality of keys 128. The arrangement of the plurality of keys 128 is not particularly limited. In some embodiments, the plurality of keys 128 includes keys associated with letters of the alphabet arranged in a QWERTY keyboard layout. In other embodiments, the plurality of keys can be associated with numbers and arranged in a numeric keypad layout. Furthermore, in other embodiments, the portable electronic device 104 can be modified to omit the plurality of keys 128. In portable electronic devices without a plurality of keys, the portable electronic devices are generally configured to include a touchscreen display capable of receiving similar input using a virtual keyboard. Other types of input devices are also contemplated. For example, a touchpad, joystick, trackball, track-wheel, or optical camera or flex sensor or any one or more of them can be provided, in addition to or in lieu of the plurality of keys 128.

The portable electronic device 104 also includes a speaker 132 for generating audio output in the present embodiment. Furthermore, the portable electronic device 104 also includes a microphone 136 for receiving audio input. It is to be appreciated in other embodiments of portable electronic devices, such as those without capabilities for providing voice communication, the speaker and microphone is be optional.

Figure 3:
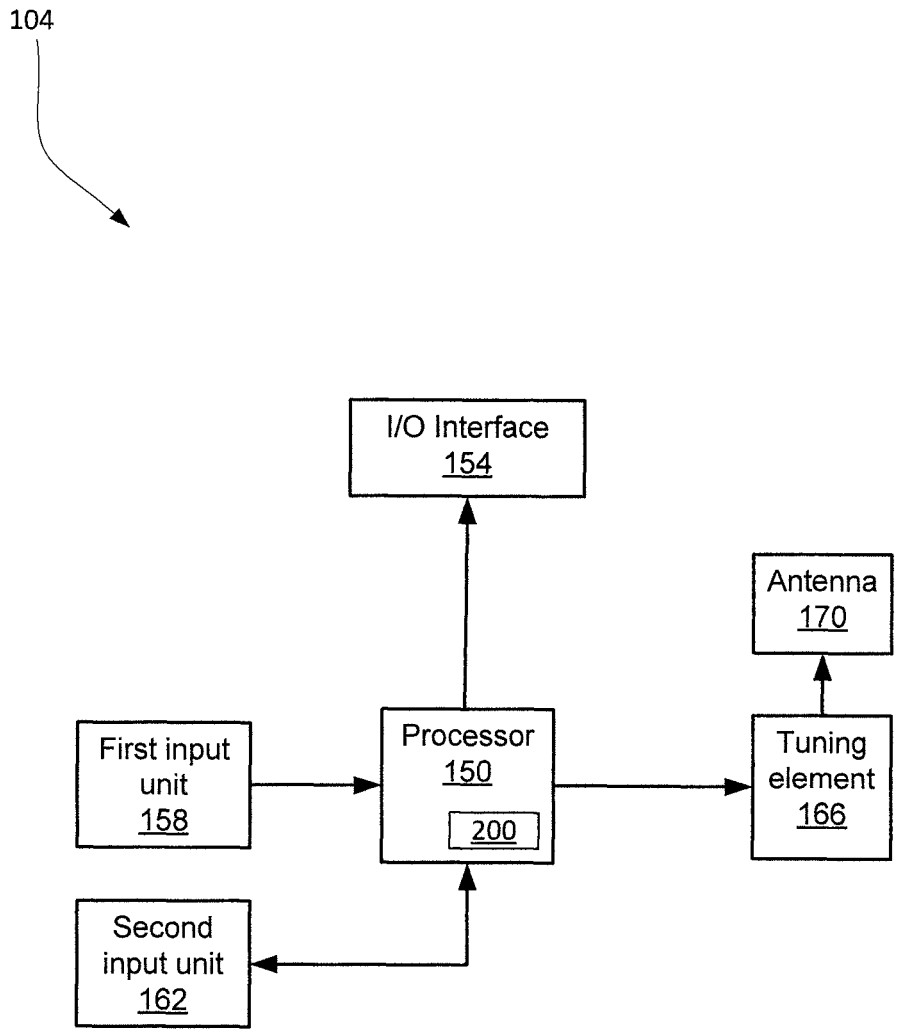
FIG. 3 is a schematic block diagram of the portable electronic device shown in FIG. 2.

Referring to FIG. 3, a schematic block diagram of the electronic components of the portable electronic device 104 is shown. It should be emphasized that the structure in FIG. 3 is purely exemplary. The portable electronic device 104 includes a processor 150 running programming instructions 200. In general, the programming instructions 200 are stored in a non-transitory computer readable storage medium accessible by the processor 150. The portable electronic device 104 also includes a communication interface 154, a first input unit 158, a second input unit 162, and a tuning element 166, all of which are in communication with the processor 150. Furthermore, the portable electronic device 104 also includes an antenna 170.

The processor 150 is generally configured to be in communication with the communication interface 154, the first input unit 158, the second input unit 162, and the tuning element 166. The processor 150 is configured to execute programming instructions 200 and for receiving data from other components of the portable electronic device 104, which include the communication interface 154 as well as the input units 158 and 162. Furthermore, the processor 150 is also configured to send tuning instructions to the tuning element 166.

The processor 150 is connected to the communication interface 154. The communication interface 154 is generally configured to connect an input device or an output device associated with the operation the portable electronic device 104. The communication interface 154 is not particularly limited to any specific application. For example, the communication interface 154 can be used to connect the processor 150 with the display 124 for rendering visual output on the display. In addition, communication interface 154 can be used by the processor 150 to receive input data from the plurality of keys 128.

The processor 150 is further connected to the first input unit 158 generally configured to receive a set data indicative of possible physical states. In the present embodiment, the first input unit 158 generally includes a dedicated sensor. Therefore, the first input unit 158 is always in "listening mode" and constantly receiving data from the environment of the portable electronic device 104. Alternatively, in some embodiments, the first input unit 158 can be modified to receive data only during predetermined time periods. Outside of the predetermined time periods, the first input unit 158 can be de-activated to conserve battery life. It is re-emphasized that the first input unit 158 is not particularly limited and can include a single sensor or a plurality of sensors in the portable electronic device 104. In addition, the first input unit 158 can be modified such that it is not dedicated. For example, in some embodiments, the first input unit 158 can be inactive to conserve power and only activated when the process 150 receives input from an input device for tuning the antenna 170. Furthermore, the first input unit 158 can include more than one type of sensor. For example, the first input unit 158 can include at least one of an accelerometer, gyroscope, magnetometer, light sensor, proximity sensor, orientation sensor, altimeter, barometer, thermometer, gravity sensor, touch sensor, stress sensor, pressure sensor, a Hall Effect sensor, radio frequency (RF) power detector, voice detector, digital signal processing monitor, voltage standing wave ratio monitor, device detector, keyboard, touch input device, camera, GPS, and input received from a wireless transmission link.

In the present embodiment, the processor 150 is further connected to another input unit 162 generally configured to receive another set data capable of distinguishing between the possible physical states determined from each other. It is to be understood that the input unit 162 is not particularly limited and that several different types of sensors are contemplated such as those contemplated for the input unit 158. However, the input unit 162 differs from the input unit 158 in that the input unit 162 is not a dedicated input unit. Therefore, when the input unit 162 is not in use, the input unit 162 is generally de-activated to conserve battery life of the portable electronic device 104. It is to be understood that by leaving the input unit 162 de-activated in general, the portable electronic device 104 can conserve battery life by not providing power to both input units 158 and 162 constantly.

The processor 150 is connected to the tuning element 166 generally configured to tune the antenna 170. In the present embodiment, the tunable element 166 is configured to set an impedance based on parameters received from the processor. In addition, the tunable element 166 can also optionally include a separate processor (not shown) for running a tuning algorithm to fine-tune the antenna based on an adaptive tuning system.

In the present embodiment, the antenna 170 is configured as a radio antenna for communicating over the wireless transmission link 112. It will be understood that the antenna 170 is configured to correspond with the network architecture that defines such the wireless transmission link 112 and that the antenna 170 is capable of operating at a plurality of different frequencies. Commonly employed network architectures for the wireless transmission link 112 include, but are not limited to, Global System for Mobile communication ("GSM") at approximately one of 850 MHz, 900 MHz, 1800 MHz, or 1900 MHz, General Packet Relay Service ("GPRS"), Enhanced Data Rates for GSM Evolution ("EDGE"), 3G, High Speed Packet Access ("HSPA"), Code Division Multiple Access ("CDMA"), Evolution-Data Optimized ("EVDO"), LTE (Long Term Evolution), WiMax, ZigBee, Institute of Electrical and Electronic Engineers ("IEEE") standard 802.11, Bluetooth™ or any of their variants or successors.

The programming instructions 200 cause the processor 150 to receive a set of data from the first input unit 158. The programming instructions 200 direct the processor 150 to analyze the set of data to determine a plurality of possible physical states of the portable electronic device 104. A physical state of the portable electronic device 104 generally describes the environment in which the portable electronic device is located. The physical state of the portable electronic device 104 affects the performance of the antenna 170. Each physical state is predetermined such that the antenna 170 performs substantially the same in each physical state. Therefore, it is to be understood that by defining a greater number of physical states, the performance of the antenna 170 can be further improved. However, a greater number of physical states are more difficult to resolve using the input units 158 and 162. Examples of physical states of the portable electronic device 104 include hand-held operation against a head, resting on a desk, docked to a cradle, in a holster, in a car, and in a handbag. After determining the plurality of possible physical states, the processor 150 is directed to activate the second input unit 162 based on the plurality of possible physical states previously determined. The processor 150 then receives another set of data from the second input unit 162. The programming instructions 200 are configured to direct the processor 150 to select a physical state of the portable electronic device 104 from the previously determined plurality of possible physical states using the additional set of data. Once the physical state of the portable electronic device 104 is determined, the programming instructions 200 proceed to direct the processor 150 to send data to the tunable element 166 to cause the tunable element to tune the antenna 170. Therefore, it is to be understood that the antenna 170 is effectively tuned based on the physical state of the portable electronic device 104.

In general terms, the processor 150 is generally configured to tune the antenna 170 for improved performance. However, it is to be re-emphasized that the structure shown in FIGS. 2 and 3 are schematic, non-limiting representations only. For example, although the portable electronic device 104 shown in FIG. 3 shows the programming instructions being executed by the processor 150, it is to be understood that the programming instructions 200 can either form a decision making subsystem within the processor 150 or be carried out by a separate processor. Furthermore, it can be noted that programming instructions 200 can be effected as software that is loaded for execution on processor 150 at run-time, or the programming instructions 200 can be hard coded into processor 150. (Various other ways of implementing programming instructions 200 will now, with the benefit of the teachings of this specification, be apparent to the person skilled in the art, and some specific non-limiting examples of such will be discussed in greater detail below.)

Figure 4:
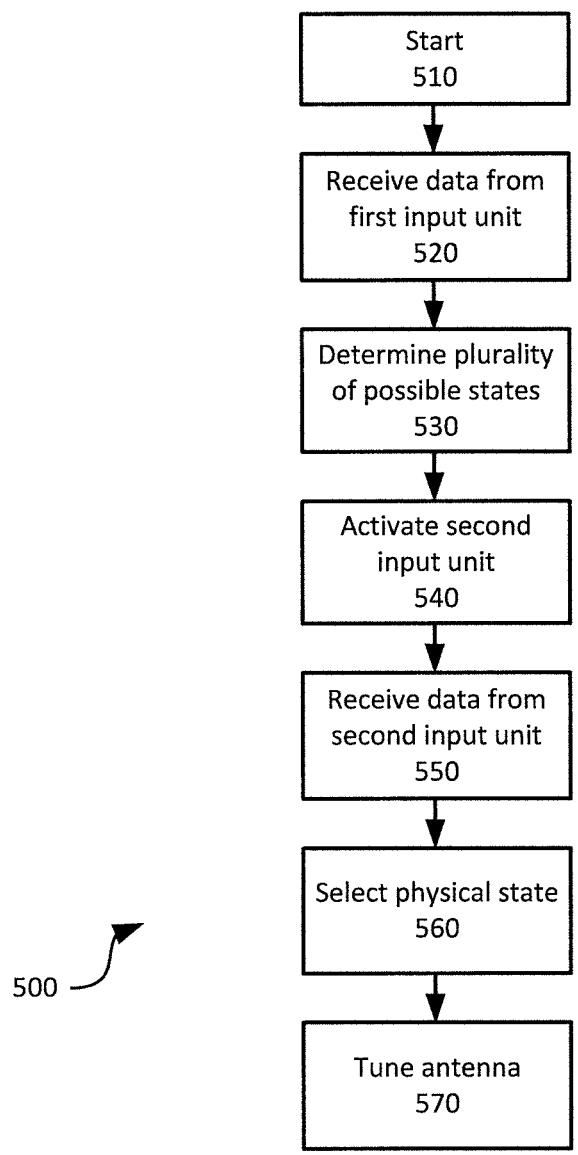
FIG. 4 is a flow chart of a method for tuning an antenna in accordance with an embodiment.

Referring now to FIG. 4, a method for tuning the antenna 170 of a portable electronic device 104 is represented in the form of a flow-chart and indicated generally at 500. Method 500 can be implemented generally as part of the operating system of the portable electronic device 104 or as part of a specific application running on the portable electronic device. It is to be emphasized, however, that method 500 need not be performed in the exact sequence as shown and that various blocks may be performed in parallel rather than in sequence; hence the elements of the method 500 are referred to herein as "blocks" rather than "steps".

Block 510 is the start of the method 500. The manner in which the method 500 is started is not particularly limited. For example, the method 500 can start when the portable electronic device 104 is powered on and run in the background. Alternatively, the method 500 can also begin when an application requests that the antenna 170 be tuned, for example, if a voice call is initiated or a browser requests a web page. In another embodiment, the method 500 can start at predetermined time intervals. It will now also be appreciated that in some embodiments, the method 500 will generally be continuously running such that as soon as the method ends, the method will start again. By continuously running the method 500, the portable electronic device 104 is constantly tuning the antenna for improved performance as the portable electronic device changes physical states.

Block 520 comprises receiving a set of data from the first input unit 158. The manner in which the data is received is not particularly limited. The first input unit 158 is generally configured to receive data from the physical environment in which the portable electronic device 104 is situated, and which can be used to determine a plurality of possible physical states of the portable electronic device 104. The first input unit 158 subsequently provides the processor 150 with the set of data. In the present embodiment, the first input unit 158 is integrated into the portable electronic device 104 and in communication with the processor 150 via an internal bus (not shown). In other embodiments, the first input unit 158 can be an external device connected to the processor 150 via a wired or wireless connection. Furthermore, the type of data received by the first input unit 158 is also not particularly limited. For example, the data can include data from one of an accelerometer, gyroscope, magnetometer, light sensor, proximity sensor, orientation sensor, altimeter, barometer, thermometer, gravity sensor, touch sensor, stress sensor, pressure sensor, a Hall Effect sensor, radio frequency (RF) power detector, voice detector, digital signal processing monitor voltage standing wave ratio monitor, device detector, keyboard, touch input device, camera, GPS, and input received from a wireless transmission link.

Block 530 comprises using the set of data from the first input unit 158 to determine a plurality of possible physical states of the portable electronic device 104. In the present embodiment, the processor 150 is configured to analyze the set of data from the first input unit 158. The possible physical states are not particularly limited and can include various conditions such as the type of environment and the position of the portable electronic device 104 within the environment. Furthermore, depending on the type of data collected, various different means can be used to determine the possible physical states. For example, if the first input unit includes a light sensor (not shown) physically proximate to the speaker 132 and an accelerometer (not shown), which detect low light and that the portable electronic device 104 is vertically oriented with the speaker 132 at the top, respectively, then possible physical states can include being held against the side of a head where the light sensor is covered and being stored in a holster.

Block 540 comprises activating the second input unit 162. In the present embodiment, the second input unit 162 is generally in a standby or de-activated state for conserving the battery life of the portable electronic device 104.

Block 550 comprises receiving another set of data from the second input unit 162. In the present embodiment, the second input unit 162 receives data in a similar manner as the first input unit 158. The second input unit 162 generally includes other types of sensors not included in the first input unit 158. However, in other embodiments, the second input unit 162 can be modified to include collecting the same type of data as the first input unit 158. For example, if the first input unit 158 includes a camera dedicated to operate in a low resolution mode, a plurality of possible physical states can be determined from low resolution images. In this example, the second input unit 162 can include switching the camera to a high resolution mode for collecting high resolution images. Similarly, the if the first input unit 158 receives data at a low sampling rate to determine a plurality of possible physical states, the second input unit 162 can collect data at a higher sampling rate.

Block 560 comprises using the set of data from the second input unit 162 to select the physical state of the portable electronic device 104 from the plurality of physical states. The selection is made by the processor 150 after analyzing the set of data from the second input unit 162. In some cases, the set of data from the second input unit 162 conclusively leads to only one possible physical state to be selected from the plurality of physical states. For example, if the plurality of possible physical states (after a determination at Block 530) consist only of being on a table with the display 124 facing away from the table or the display facing toward the table, and the second input unit 162 includes an accelerometer to conclusively determine the physical state. In this example, the physical state of the portable electronic device 104 can be one of only two possible physical states which can clearly be resolved with the accelerometer. In some cases, the set of data from the second input unit 162 cannot conclusively lead to only one possible physical state. When no conclusive physical state can be determined, a probability can be assigned to each possible physical state in the plurality of possible physical states using the set of data from the second input unit 162. In some embodiments, the set of data from the first input unit 158 can also be used in combination with the set of data from the second input unit 162 to determine the probability for each physical state. The physical state of the portable electronic device 104 is then selected to be the physical state with the highest probability.

Block 570 comprises using the physical state selected at Block 560 to tune the antenna 170. In the present embodiment, the processor 150 directs the tuning element 166 to tune the antenna 170. The manner in which the antenna 170 is tuned is not particularly limited. For example, the tuning element 166 can include an impedance tuner capable to adjusting the impedance of the antenna system to improve the performance of the antenna 170 based on predetermined parameters for a given physical state.

Furthermore, it is to be understood that the method 500 can be configured to loop optionally back to the start at Block 510 to provide for continuous tuning of the antenna 170.

Figure 5:
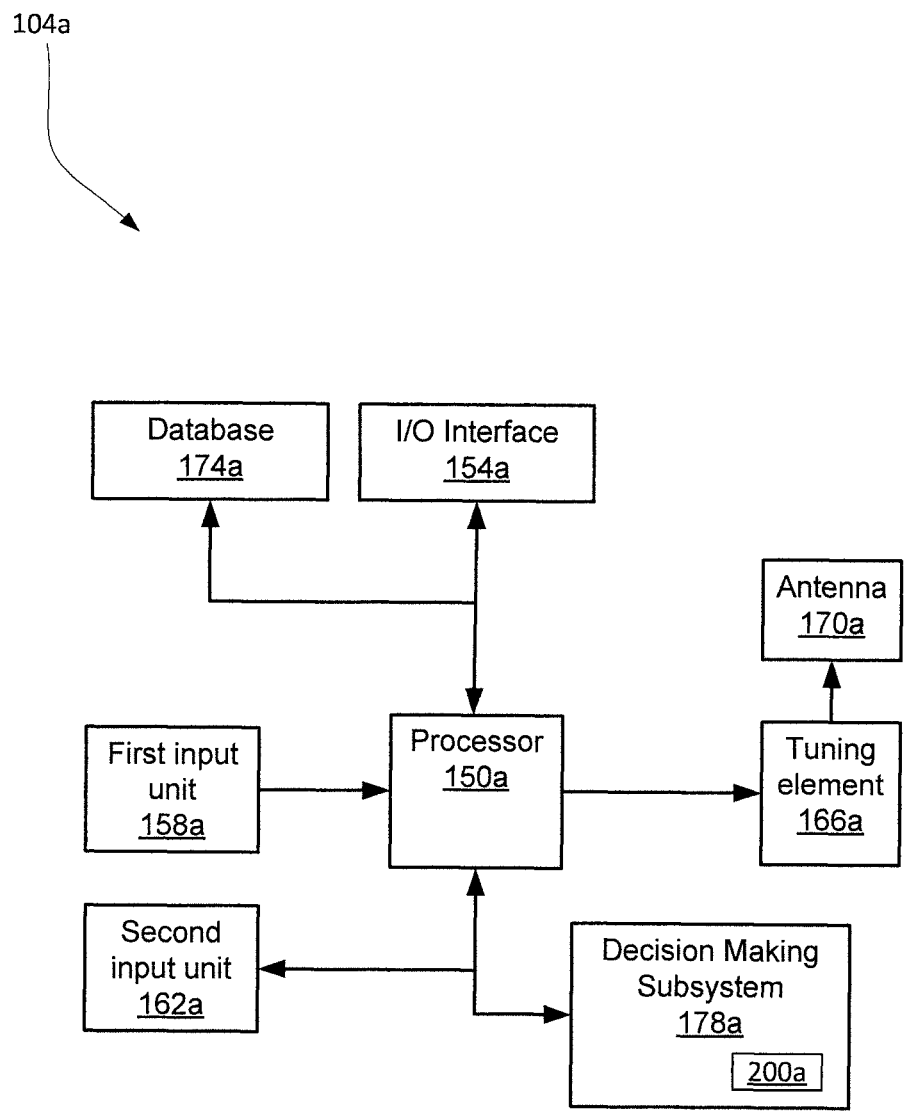
FIG. 5 is a schematic block diagram of a device in accordance with another embodiment.

Referring to FIG. 5, a schematic block diagram of another embodiment of a portable electronic device 104a is generally shown. Like components of the portable electronic device 104a bear like reference to their counterparts in the portable electronic device 104, except followed by the suffix "a". For example, the portable electronic device 104a includes a processor 150a, an input output interface 154a, a first input unit 158a, a second input unit 162a, a tuning element 166a, and an antenna 170a. In addition, the portable electronic device 104a includes a database 174a and a decision making subsystem 178a.

The processor 150a is generally configured to perform similar functions as the processor 150. However, in the present embodiment, the portable electronic device 104a further includes a database 174a in communication with the processor 150a. The database 174a is generally configured to store parameters for tuning the antenna 170a. Therefore, once the physical state of the portable electronic device 104a has been selected, the processor 150a can select and retrieve the predetermined parameters from the database 174a corresponding to the physical state of the portable electronic device 104a. The selected parameters are then sent to the tuning element 166a for tuning the antenna 170a. It is to be appreciated that since each physical state is predetermined, the database 174a will have a corresponding set of parameters associated with each of the physical states in the database. In the present embodiment, the database 174a resides in a non-volatile storage medium in the portable electronic device 104a. However, in other embodiments, the database 174a can be stored on an external storage device. In further embodiments, the database 174a can be loaded onto the portable electronic device, for example, wirelessly downloaded when the portable electronic device 104a is initiated during a boot, and stored in a volatile storage medium. In the present embodiment, the data includes a table correlating a plurality of physical states with predetermined antenna parameters.

The portable electronic device 104a further includes a separate decision making subsystem 178a. The decision making subsystem 178a is generally configured to execute programming instructions 200a for tuning the antenna 170a. The programming instructions 200a direct the decision making subsystem 178a to analyze the set of data to determine a plurality of possible physical states of the portable electronic device 104a. Therefore, the decision making subsystem 178a is responsible for determining a plurality of possible physical states. In addition, the programming instructions 200a also direct the decision making subsystem 178a to analyze the set of data from the second input unit 162a to select a physical state from the possible physical states. In some embodiments, the decision making subsystem 178a can be inactive when not in use to further conserve power. Therefore, the processor 150a is required to activate the decision making subsystem 178a for the purpose of executing the programming instructions 200a. For example, the decision making subsystem 178a can be activated for the purpose of determining a plurality of possible physical states of the portable electronic device and then subsequently de-activated. Similarly, the decision making subsystem 178a can be activated for the purpose of selecting the physical state of the portable electronic device and then subsequently de-activated. In the present embodiment, the decision making subsystem 178a includes a decision making processor (not shown) that is separate from the processor 150a. The decision making subsystem 178a is dedicated to running the programming instructions 200a for tuning the antenna 170a. In other embodiments, the decision making subsystem 178a can be modified to include a portion of the processor 150a dedicated to running the programming instructions 200a, wherein the portion can be separately activated and de-activated. For example, if the processor 150a is an array processor comprised of an array of processing elements, then the decision making subsystem 178a may utilize one or more processing elements of the processor 150a. As another example, programming instructions 200a and other programming instructions discussed herein can execute on a single processor as separate threads or processes. In general, it is to be understood that the various hardware structures discussed herein are non-limiting examples. Other types of hardware structures can be used to implement programming instructions 200a and other programming instructions discussed here. Such hardware variations are within the scope of the present specification. These variations are likewise applicable to other embodiments.

Figure 6:
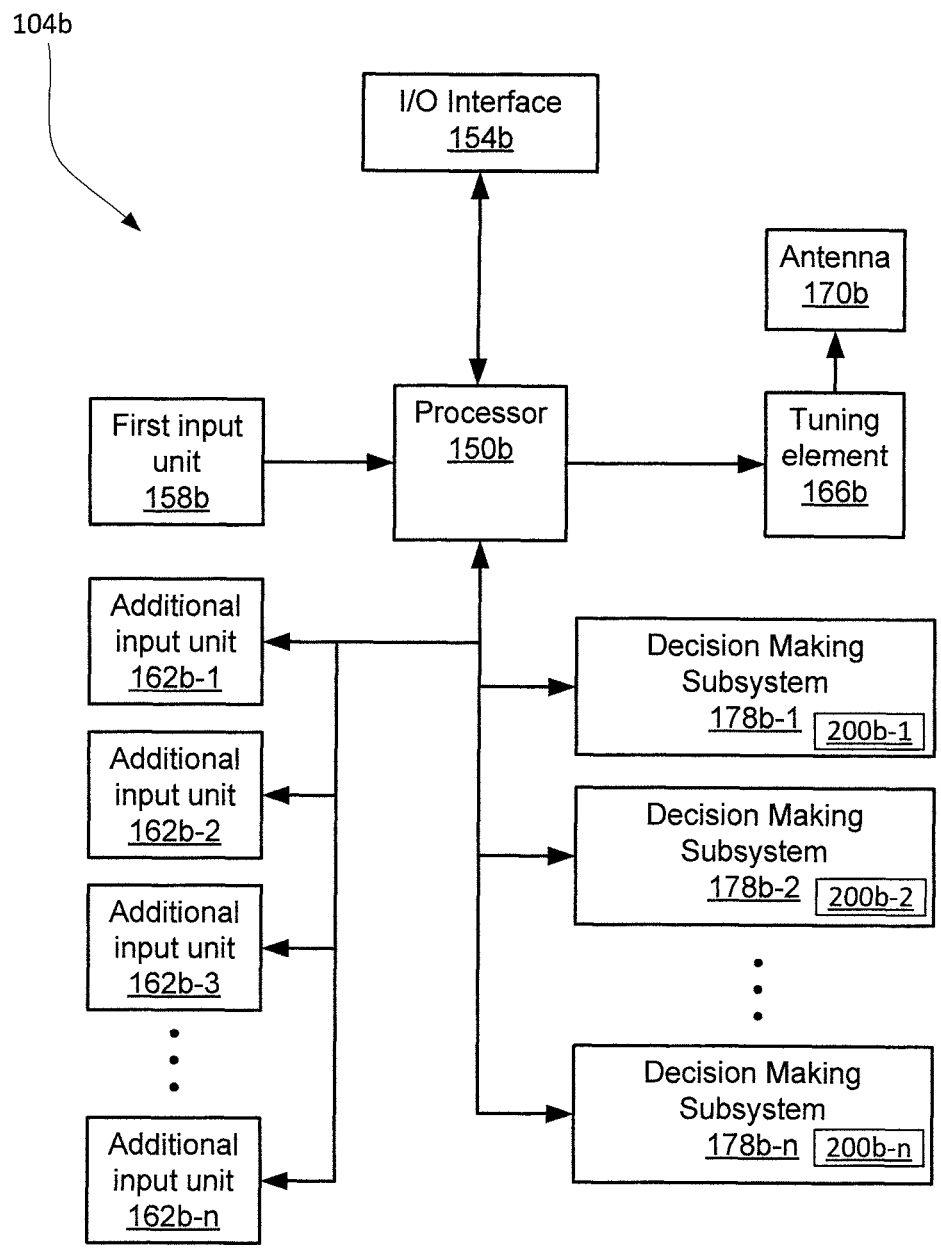
FIG. 6 is a schematic block diagram of a device in accordance with yet another embodiment.

Referring to FIG. 6, a schematic block diagram of another embodiment of a portable electronic device 104b is generally shown. Like components of the portable electronic device 104b bear like reference to their counterparts in the portable electronic device 104, except followed by the suffix "b". For example, the portable electronic device 104b includes a processor 150b, an input output interface 154b, a first input unit 158b, a tuning element 166b, and an antenna 170b. In addition, the portable electronic device 104b includes a plurality of additional input units 162b-1, 162b-2, 162b-3, . . . , 162b-n (collectively referred to as 162b) and a plurality of decision making subsystems 178b-1, 178b-2, . . . , 178b-n (collectively referred to as 178b). It is to be understood that the exact number of additional input units 162b and decision making subsystems 178b is not particularly limited and can vary in different portable electronic devices.

In the present embodiment, the portable electronic device 104b further includes a plurality of separate decision making subsystems 178b. The decision making systems 178b are generally configured to execute a corresponding plurality of programming instructions 200b-1, 200b-2, . . . , 200b-n (collectively referred to as 200b). At least one of the decision making subsystems 178b is configured to run corresponding programming instructions 200b to analyze the set of data from the first input unit 158b to determine a plurality of possible physical states of the portable electronic device 104b. Therefore, the at least one of the decision making subsystems 178b is responsible for determining a plurality of possible physical states. Furthermore, at least one of the decision making subsystems 178b is configured to run corresponding programming instructions 200b to select a physical state from the plurality of possible physical states. It is to be appreciated that the same decision making subsystem, such as 178b-1, can be used for determining the plurality of possible physical states as well as for selecting a physical state from the plurality of possible physical states. Alternatively, different decision making subsystems, such as 178b-1 and 178b-2 can be used for determining the plurality of possible physical states and for selecting a physical state from the plurality of possible physical states, respectively.

In the present embodiment, the decision making subsystems 178b are generally inactive when not in use to further conserve battery life of the portable electronic device 104b. Furthermore, each decision making subsystem of the plurality of decision making subsystems 178b can be configured to analyze different types of data from different input units 158b or 162b. Therefore, the processor 150b is required to activate one of the decision making subsystems 178b for the purpose of executing the corresponding programming instructions 200b for tuning the antenna 170b depending on type of data received. For example, the decision making subsystem 178b-1 can be activated for the purpose of determining a plurality of possible physical states of the portable electronic device and then subsequently de-activated. Next, the decision making subsystem 178b-2 can be activated for the purpose of selecting the physical state of the portable electronic device and then subsequently de-activated.

In the present embodiment, the processor 150b is further connected to a plurality of additional input units 162b, each additional input unit generally configured to receive another set of data. Each of the additional input units 162b can include a different sensor or plurality of sensors for distinguishing between the physical states in the plurality of possible physical states. It is to be understood that the input units 162b are not particularly limited and that several different types of sensors are contemplated such as those contemplated for the input unit 158b. However, the additional input units 162b differ from the input unit 158b in that the additional input units 162b are not dedicated input units. Therefore, when the additional input units 162b are not in use, the additional input units 162b are generally de-activated or in standby mode to conserve battery life of the portable electronic device 104b. After a plurality of possible physical states is determined, one of the plurality of decision making subsystems 178b can select a specific input unit, such as 162b-1, from the plurality of additional input units 162b. The manner in which the additional input unit 162b-1 is selected is not particularly limited. In the present embodiment, the selection of the additional input unit 162b-1 is made by the decision making subsystem 178b-1 based on the plurality of possible physical states which were determined. In particular, the decision making subsystem 178b-1 analyze the possible physical states to determine which additional input unit of the plurality of additional input units 162b has the appropriate sensor or group of sensors to distinguish between the possible physical states. The selected additional input unit, such as 162b-1, is then activated whereas the other additional input units 162b remain de-activated. It is to be understood that by leaving the additional input units 162b which are not in use de-activated, the portable electronic device 104b can conserve battery life since power is only provided to the additional input unit 162b-1 instead of all additional input units 162b.

Figure 7:
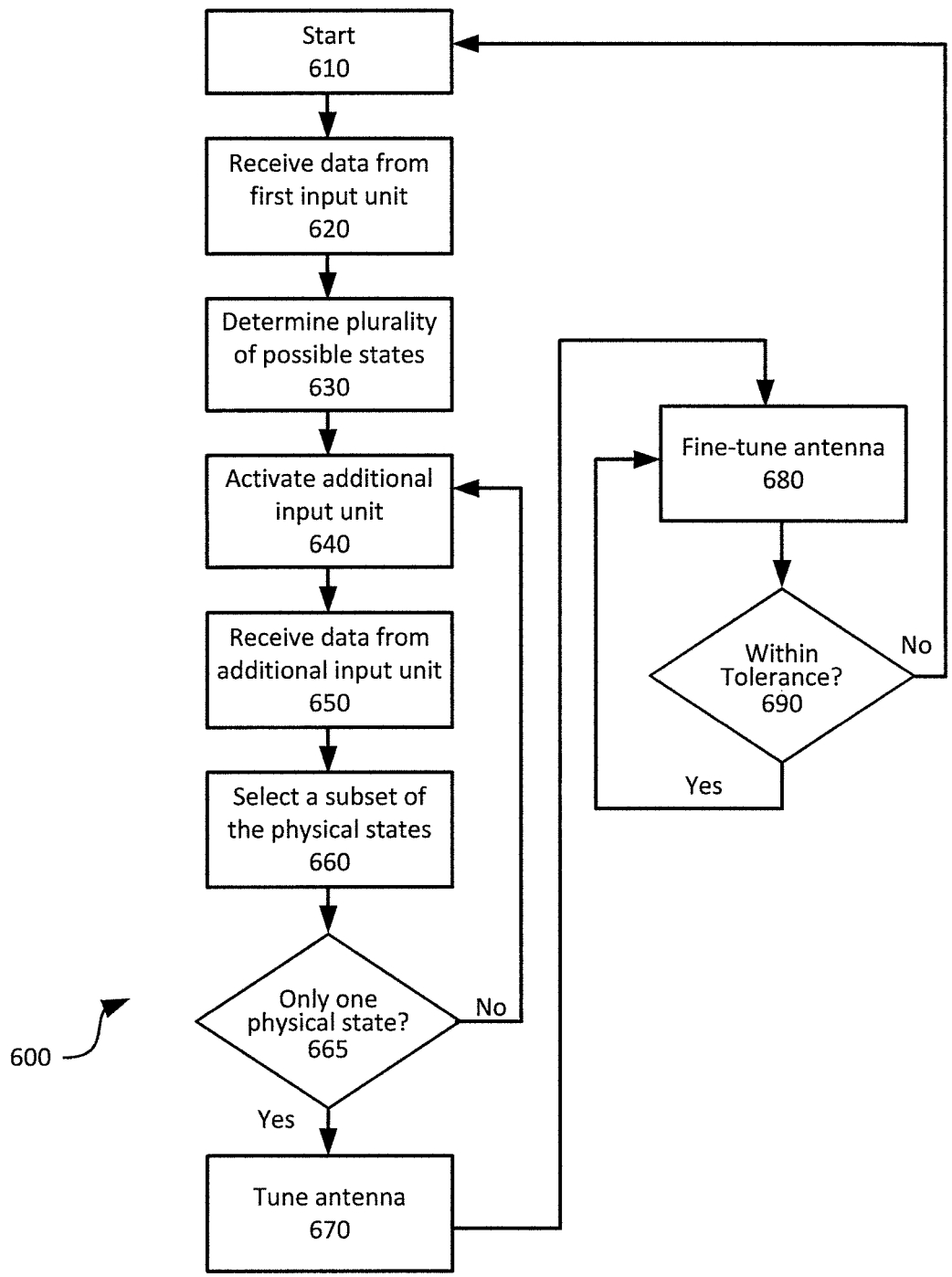
FIG. 7 is a flow chart of a method for tuning an antenna in accordance with another embodiment.

Referring now to FIG. 7, another method for tuning the antenna 170b of a portable electronic device 104b is represented in the form of a flow-chart and indicated generally at 600. Method 600 can be implemented generally as part of the operating system of the portable electronic device 104b or as part of a specific application running on the portable electronic device.

Block 610 is the start of the method 600. The manner in which the method 600 is started is not particularly limited and can include the manner discuss in connection with Block 510.

Block 620 comprises receiving a set of data from the first the first input unit 158b. The manner in which the data is received is not particularly limited. The first input unit 158b is generally configured to receive data from the environment which can be used to determine a plurality of possible physical states of the portable electronic device 104b. The first input unit 158b subsequently provides the processor 150b with the set of data. In the present embodiment, the first input unit 158b is integrated into the portable electronic device 104b and in communication with the processor 150b via an internal bus (not shown).

Block 630 comprises using the set of data from the first input unit 158b to determine a plurality of possible physical states of the portable electronic device 104b. In the present embodiment, the processor 150b is configured to analyze the set of data from the first input unit 158b. The possible physical states are not particularly limited and can include the environment and the position of the portable electronic device 104b within the environment. Furthermore, depending on the type of data collected, various different means such as those discussed above in connection with Block 530 can be used to determine the plurality of possible physical states.

Next, Block 640 comprises activating an addition input unit, such as 162b-1 of the plurality of addition input units 162b. In the present embodiment, each of the plurality of additional inputs 162b is generally de-activated for conserving the battery life the portable electronic device prior to being activated.

Block 650 comprises receiving another set of data from the additional input unit 162b-1. In the present embodiment, the additional input unit 162b-1 receives data in a similar manner as the first input unit 158b. In the present embodiment, the additional input unit 162b-1 includes other types of sensors not included in the first input unit 158b. Furthermore, once the set of data from the additional input unit 162b-1 is provided to the processor 150b, the additional input unit 162b-1 is de-activated.

Block 660 comprises using the set of data from the additional input unit 162b-1 to select a subset of physical states of the portable electronic device 104b from the plurality of physical states. The selection can be made by the decision making subsystem 178b-1 after analyzing the set of data from the additional input unit 162b-1. In some cases, the set of data from the additional input unit 162b-1 conclusively leads to only one possible physical state to be selected from the plurality of physical states. Therefore, the subset of physical states only includes a single physical state. In other cases, the set of data from the additional input unit 162b-1 cannot conclusively lead to only one possible physical state. When no conclusive physical state can be determined, a probability can be assigned to each possible physical state in the plurality of possible physical states using the set of data from the additional input unit 162b-1. In some embodiments, the set of data from the first input unit 158b can also be used in combination with the set of data from the additional input unit 162b-1 to assign the probability. The subset of physical states of the portable electronic device 104b is then selected from the plurality of possible physical states using a predetermined threshold probability. Alternatively, a predetermined number of physical states can be selected such that the least probable physical states are automatically dropped.

Next, Block 665 comprises determining whether the subset of physical states consists of only a single physical state. The determination can be made by a decision making subsystem, such as 178b-1, of the plurality of decision making subsystems 178b. Although the same decision making subsystem is used to make this determination in the present embodiment, a different decision making subsystem can be used in other embodiments. In the present embodiment, a determination that the subset of physical states consists of only a single physical state leads to Block 670. Alternatively, if a determination is made that the subset of physical states comprises more than one physical state, the method returns to Block 640 of the method. At Block 640, a different additional input unit, such as 162b-2 is activated to further distinguish the physical states in the subset of physical states. It is to be understood that the method 600 will continue this loop until the subset of physical states consists of only a single physical state in the present embodiment. In other embodiments, the method 600 can be modified to permit a fixed number of iterations of this loop and force a selection of a physical state even if its assigned probability is below the threshold. For example, the fixed number of iterations can correspond to the number of additional input units 162b, which can all be eventually activated in turn, or it can correspond to another predetermined number. The iterations can also be limited by monitoring the change in assigned probabilities. For example, if the probability of each physical state in the subset of physical states remains substantially unchanged, the loop can be stopped so that the method proceeds to Block 670.

Block 670 comprises using the physical state selected at Block 660 to tune the antenna 170b. In the present embodiment, the processor 150b directs the tuning element 166b to tune the antenna 170b using parameters associated with the selected physical state. The manner in which the antenna 170b is tuned is not particularly limited and includes those contemplated above in connection with Block 570.

Block 680 comprises fine-tuning the antenna 170b using a tuning algorithm. In the present embodiment, the tuning element 166b can include an adaptive tuning system having a separate processor (not shown) with programming instructions to carry out further fine-tuning of the antenna. For example, the tuning element 166b can also include sensors to perform a closed-loop tuning process. It is to be appreciated that the fine-tuning process can be used to tune the antenna 170b without the method 600. However, it also to be understood that by providing the tuning element 166b with parameters to tune the antenna 170b, such as in Block 670, the time required to fine-tune the antenna 170b can be substantially reduced. Furthermore, it is to be understood that by providing the parameters, the number of calculations and adjustments required by the tuning algorithm is reduced, which in turn ultimately conserves power consumption.

Block 690 comprises determining whether the performance of the antenna 170b is within a predefined tolerance. As the portable electronic device 104b is used, the portable electronic device can be moved from one physical state to another or the environmental conditions within the physical state can change such that the constant fine-tuning is required to maintain the performance. However, if the physical state of the device changes such that the environment is significantly different, the tuning algorithm will not be the most efficient way to re-tune the antenna 170b. Therefore, the performance of the antenna 170b can be monitored to determine if it is within tolerances. In the present embodiment, this determination can also be made by a decision making subsystem, such as 178b-1, of the plurality of decision making subsystems. Furthermore, it is also contemplated that the first input unit comprise a performance sensor. If a determination that the performance of the antenna deviates beyond a predetermined threshold tolerance, the method returns to Block 610 to re-tune the antenna 170b. Alternatively, if a determination is that the performance of the antenna is within a predetermined threshold tolerance, the method returns to Block 680 to fine-tune the antenna 170b again. It is to be understood that the method 600 is configured to loop for continuous tuning of the antenna 170b.

It is to be understood that variations of the portable electronic devices and methods described above are contemplated. As a non-limiting example, the portable electronic device 102b can combine the feature of the portable electronic device 102a where a database stores the predetermined parameters associated with a physical state.

Various advantages will now be apparent. Of note is the ability to efficiently tune an antenna. By not having all sensors simultaneously active, the battery life of the portable electronic device can be conserved.

While specific embodiments have been described and illustrated, such embodiments should be considered illustrative only and should not serve to limit the accompanying claims.

What is claimed is:

1. A method for tuning an antenna in a portable electronic device, the method comprising:
   activating a first input unit after a predetermined time period from a prior activation;
   receiving a first set of environmental data from a first input unit for detecting a plurality of possible physical states;
   deactivating the first input in response to receiving the first set of environmental data to converse power;
   determining the plurality of possible physical states of the portable electronic device using the first set of environmental data, wherein each physical state of the plurality of possible physical states is associated with an external environment wherein the antenna provides a substantially uniform performance in the external environment;
   selecting a second input unit to distinguish each physical state of the plurality of possible physical states, wherein the second input unit is different from the first input unit;
   activating the second input unit in response to determining the plurality of possible physical states, the second input unit being inactive until the plurality of possible physical states is determined for conserving power;
   receiving a second set of environmental data from the second input unit, wherein the second set of environmental data is different from the first set of environmental data;
   deactivating the second input unit in response to receiving the second set of environmental data;
   selecting a physical state of the portable electronic device from the plurality of possible physical states using the second set of environmental data; and
   tuning the antenna based on the physical state of the portable electronic device.

2. The method of claim 1, wherein receiving a first set of environmental data comprises receiving a first set of environmental data from a dedicated sensor.

3. The method of claim 1, wherein determining a plurality of possible physical states comprises determining a plurality of possible physical states using a decision making subsystem.

4. The method of claim 3, further comprising selecting the second input unit using the decision making subsystem.

5. The method of claim 1, wherein selecting a physical state comprises selecting a physical state using a decision making subsystem.

6. The method of claim 5, wherein further comprising activating the decision making subsystem prior to selecting a physical state.

7. The method of claim 1, further comprising selecting the second input unit based on the plurality of possible physical states.

8. The method of claim 1, wherein tuning the antenna comprises selecting parameters corresponding to the physical state of the portable electronic device.

9. The method of claim 8, wherein selecting the parameters comprises retrieving the parameters from a database.

10. The method of claim 1, further comprising fine-tuning the antenna using a tuning algorithm.

11. A portable electronic device comprising:
   an antenna;
   a tunable element for tuning the antenna;

a first input unit for receiving a first set of environmental data;

at least one additional input unit for receiving a second set of environmental data; and a processor in communication with the tunable element, the first input unit, and at least one additional input unit, the processor configured to:

activate the first input unit after a predetermined time period from a prior activation;

receive the first set of environmental data for detecting a plurality of possible physical states;

deactivate the first input in response to receiving the first set of environmental data to conserve power;

determine the plurality of possible physical states of the portable electronic device using the first set of environmental data, wherein each physical state of the plurality of possible physical states is associated with an external environment wherein the antenna provides a substantially uniform performance in the external environment;

activate a second input unit selected from the at least one additional input unit in response to determining the plurality of possible physical states, wherein the second input unit is different from the first input unit, the second input unit being inactive until the plurality of possible physical states is determined for conserving power;

receive the second set of environmental data from the second input unit, wherein the second set of environmental data is different from the first set of environmental data;

deactivate the second input unit in response to receiving the second set of environmental data;

select a physical state of the portable electronic device from the plurality of possible physical states using the second set of environmental data; and cause the tunable element to tune the antenna based on the physical state of the portable electronic device.

12. The portable electronic device of claim 11, wherein the first input unit comprises a dedicated sensor.

13. The portable electronic device of claim 11, wherein the processor includes a decision making subsystem configured to determine a plurality of possible physical states.

14. The portable electronic device of claim 11, wherein the processor includes a decision making subsystem configured to select a physical state from the plurality of possible physical states.

15. The portable electronic device of claim 14, wherein the processor is configured to activate the decision making subsystem.

16. The portable electronic device of claim 11, wherein the processor is further configured to select the second input unit based on the plurality of possible physical states.

17. The portable electronic device of claim 11, wherein the processor is configured to send parameters to the tunable element, the parameters corresponding to the physical state of the portable electronic device.

18. The portable electronic device of claim 17, further comprising a database for storing the parameters, the database in communication with the processor.

19. The portable electronic device of claim 11, wherein the tunable element is configured to fine-tune the antenna using a tuning algorithm.

20. A computer readable storage medium encoded with codes for directing a processor to:

activate a first unit after a predetermined time period from a prior activation;

receive a first set of environmental data from the first input unit for detecting a plurality of possible physical states;

deactivate the first input in response to receiving the first set of environmental data to conserve power;

determine the plurality of possible physical states of the portable electronic device using the first set of environmental data, wherein each physical state of the plurality of possible physical states is associated with an external environment wherein an antenna provides a substantially uniform performance in the external environment;

activate a second input unit in response to determining the plurality of possible physical states, wherein the second input unit is different from the first input unit, the second input unit being inactive until the plurality of possible physical states is determined for conserving power;

receive a second set of environmental data from the second input unit, wherein the second set of environmental data is different from the first set of environmental data;

deactivate the second input unit in response to receiving the second set of environmental data;

select a physical state of the portable electronic device from the plurality of possible physical states using the second set of environmental data; and tune the antenna based on the physical state of the portable electronic device.

* * * * *